(12) United States Patent
Johnson et al.

(10) Patent No.: US 8,778,182 B2
(45) Date of Patent: Jul. 15, 2014

(54) SPIRAL WOUND ELEMENT AND SEAL ASSEMBLY

(75) Inventors: Jon E. Johnson, Plymouth, MN (US); Matthew D. Mittag, Eden Prairie, MN (US)

(73) Assignee: Dow Global Technologies LLC, Midland, MI (US)

(*) Notice: Subject to any disclaimer, the term of this patent is extended or adjusted under 35 U.S.C. 154(b) by 591 days.

(21) Appl. No.: 13/192,879

(22) Filed: Jul. 28, 2011

(65) Prior Publication Data

US 2013/0026090 A1    Jan. 31, 2013

(51) Int. Cl.
| | | |
|---|---|---|
| *B01D 29/66* | (2006.01) | |
| *B01D 63/10* | (2006.01) | |
| *B01D 63/12* | (2006.01) | |
| *B01D 65/02* | (2006.01) | |
| *C02F 1/44* | (2006.01) | |
| *C02F 103/08* | (2006.01) | |
| *B01D 53/22* | (2006.01) | |

(52) U.S. Cl.
CPC ............ *C02F 1/44* (2013.01); *C02F 2201/004* (2013.01); *C02F 1/442* (2013.01); *B01D 63/10* (2013.01); *B01D 2313/04* (2013.01); *B01D 2321/02* (2013.01); *B01D 63/12* (2013.01); *C02F 1/444* (2013.01); *B01D 2313/08* (2013.01); *B01D 65/02* (2013.01); *C02F 2103/08* (2013.01); *B01D 2313/18* (2013.01); *C02F 1/441* (2013.01); *B01D 2313/083* (2013.01); *B01D 2053/221* (2013.01)
USPC ............ 210/321.69; 210/321.74; 210/321.83; 210/106

(58) Field of Classification Search
CPC .. B01D 63/10; B01D 65/027; B01D 2313/04; B01D 2313/083; B01D 2313/16; B01D 2313/21; B01D 2312/04
See application file for complete search history.

(56) References Cited

U.S. PATENT DOCUMENTS

| | | |
|---|---|---|
| 4,016,083 A | 4/1977 | Sakaguchi et al. |
| 4,277,344 A | 7/1981 | Cadotte |
| 4,765,897 A | 8/1988 | Cadotte et al. |
| 4,888,116 A | 12/1989 | Cadotte et al. |
| 4,964,998 A | 10/1990 | Cadotte et al. |
| 4,990,248 A | 2/1991 | Brown et al. |
| 4,992,170 A | 2/1991 | Menon et al. |
| 5,096,584 A | 3/1992 | Reddy et al. |
| 5,128,037 A | 7/1992 | Pearl et al. |
| 5,538,642 A | 7/1996 | Solie |
| 5,658,460 A | 8/1997 | Cadotte et al. |
| 5,755,964 A | 5/1998 | Mickols |
| 5,876,602 A | 3/1999 | Jons et al. |
| 6,074,595 A | 6/2000 | Eisberg et al. |
| 6,165,303 A | 12/2000 | Darby et al. |
| 6,224,767 B1 | 5/2001 | Fujiwara et al. |
| 6,280,853 B1 | 8/2001 | Mickols |

(Continued)

FOREIGN PATENT DOCUMENTS

| | | |
|---|---|---|
| EP | 0076421 A2 | 4/1983 |
| EP | 0141201 A1 | 5/1985 |

(Continued)

*Primary Examiner* — Benjamin Kurtz
(74) *Attorney, Agent, or Firm* — Edward W. Black

(57) ABSTRACT

A spiral wound element and a seal assembly comprising: a ring-shaped seal disposed about a portion of an outer periphery of the element, a secondary pathway and a valve that selectively permits fluid flow through the secondary pathway.

4 Claims, 4 Drawing Sheets

(56) References Cited

U.S. PATENT DOCUMENTS

| | | |
|---|---|---|
| 6,299,772 B1 | 10/2001 | Huschke |
| 6,345,961 B1 | 2/2002 | Oklejas, Jr. |
| 6,632,356 B2 | 10/2003 | Hallan et al. |
| 6,878,278 B2 | 4/2005 | Mickols |
| 6,881,336 B2 | 4/2005 | Johnson |
| 6,905,604 B2 | 6/2005 | Taber |
| 7,097,690 B2 | 8/2006 | Usher et al. |
| 7,198,719 B2 | 4/2007 | Chikura et al. |
| 7,208,088 B2 | 4/2007 | Almasian et al. |
| 7,540,956 B1 | 6/2009 | Kurth et al. |
| 7,815,987 B2 | 10/2010 | Mickols et al. |
| 7,875,177 B2 | 1/2011 | Haynes et al. |
| 7,882,963 B2 | 2/2011 | Mickols et al. |
| 7,905,361 B2 | 3/2011 | Niu et al. |
| 7,918,349 B2 | 4/2011 | Mickols et al. |
| 7,951,295 B2 | 5/2011 | Larson et al. |
| 8,377,300 B2 * | 2/2013 | Katayama et al. ............ 210/232 |
| 2007/0272628 A1 | 11/2007 | Mickols et al. |
| 2008/0308504 A1 | 12/2008 | Hallan et al. |
| 2010/0090251 A1 | 4/2010 | Lorenz et al. |
| 2010/0147761 A1 | 6/2010 | McCollam |
| 2010/0147781 A1 | 6/2010 | Newman et al. |
| 2010/0326910 A1 | 12/2010 | van der Padt et al. |
| 2011/0042294 A1 | 2/2011 | Bonta et al. |
| 2011/0174713 A1 | 7/2011 | Shelby et al. |

FOREIGN PATENT DOCUMENTS

| | | | |
|---|---|---|---|
| WO | 2010090251 | | 8/2010 |
| WO | WO 2010/090251 | * | 8/2010 |
| WO | 2011046944 | | 4/2011 |

* cited by examiner

SPIRAL WOUND ELEMENT AND SEAL ASSEMBLY

FIELD OF THE INVENTION

The present invention is directed toward spiral wound elements and seal assemblies.

DESCRIPTION OF THE RELATED ART

Spiral wound assemblies are used in a wide variety of fluid separations. In a conventional embodiment, one or more spiral wound elements are serially arranged within a pressure vessel. During operation pressurized feed fluid is introduced into the vessel, passes through the elements and exits the vessel in at least two streams: concentrate and permeate. In order to restrict feed fluid from bypassing the elements within the vessel, seals are positioned between the outer periphery of the elements and the inner periphery of the vessel. Representative examples are described in: US 2011/0174713, US 2010/0147761, U.S. Pat. Nos. 7,198,719, 6,299,772, 6,224,767, and WO 2010/090251. In some embodiments, seal assemblies are equipped with a bypass that permits limited feed fluid to flow around the elements, e.g. see U.S. Pat. Nos. 7,208,088, and 5,128,037. While the use of such a bypass reduces fluid stagnation in areas surrounding the elements, the bypass also reduces the effective feed fluid pressure and overall energy efficiency of the separation.

BRIEF SUMMARY OF THE INVENTION

The present invention is directed toward a spiral wound assembly including a spiral wound element and a seal assembly. The seal assembly comprises: a seal disposed about a portion of an outer periphery of the element, a secondary pathway and a valve that selectively permits fluid flow through the secondary pathway. Several embodiments provide a means for providing selected fluid flow through an annular pathway located between an element and a surrounding pressure vessel which offers improved energy consumption as compared with the aforementioned techniques. Selected embodiments allow an installed pressure vessel to be quickly and easily flushed of air during start-up. Many different embodiments are described.

BRIEF DESCRIPTION OF THE DRAWINGS

The included figures illustrate several embodiments of the subject end cap assemblies, filter assemblies and selected component parts. The figures are not to scale and include idealized views to facilitate description. Where possible, like numerals have been used throughout the figures and written description to designate the same or similar features.

DETAILED DESCRIPTION OF THE INVENTION

Figure 1:
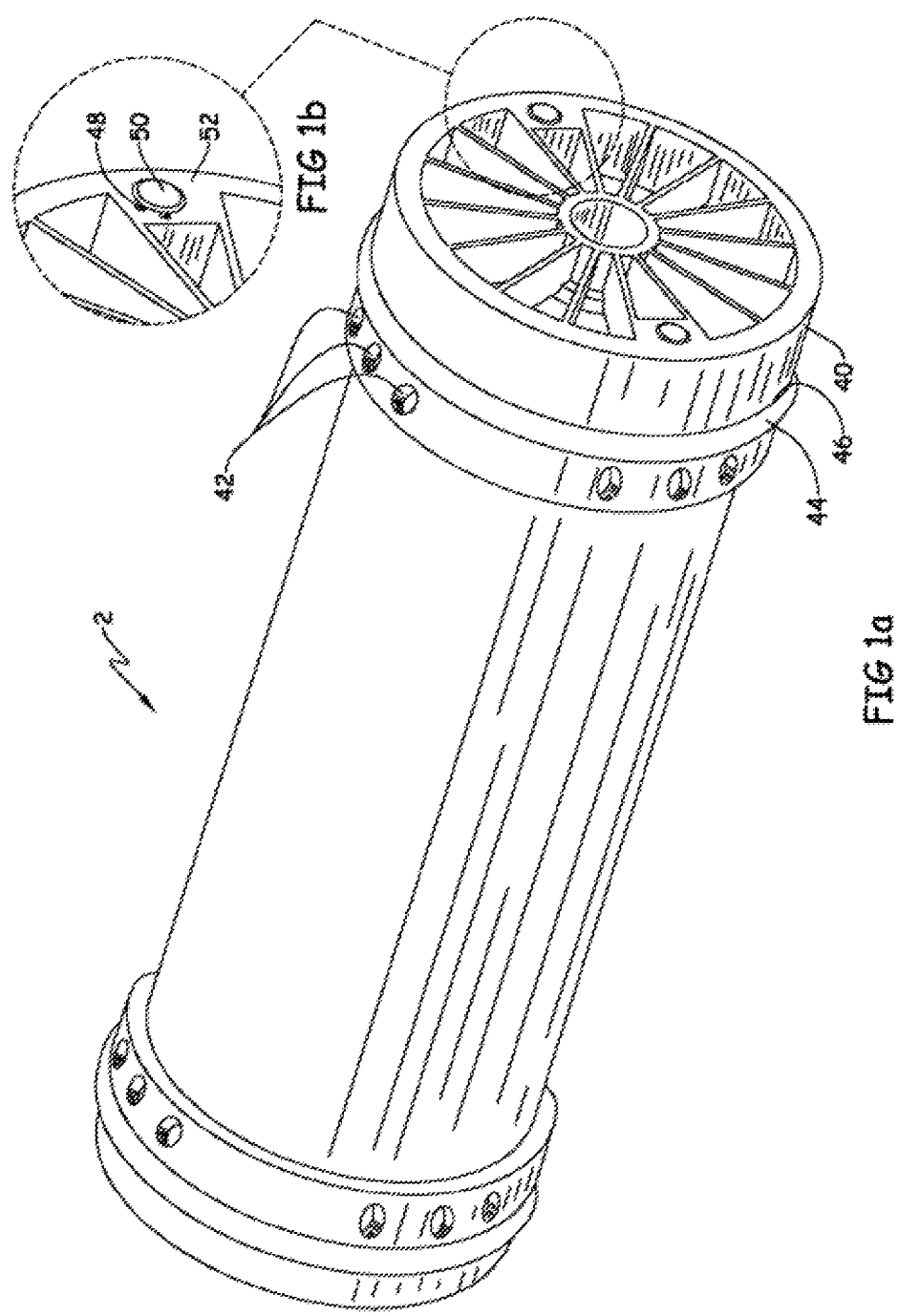
FIG. 1a, is a perspective of a spiral wound element and a first seal assembly.
FIG. 1b, is an enlarged, partially cut-away view of a valve of the first seal assembly.

In one embodiment the present invention includes a spiral wound assembly comprising a spiral wound element and a first seal assembly. The first seal assembly includes: i) a ring-shaped seal disposed about a portion of the outer periphery of the element, ii) a secondary pathway, and iii) a valve that selectively permits fluid flow through the secondary pathway. FIG. 1 illustrates one such embodiment including a spiral wound element (2) having an outer periphery and an end cap (40). A first seal assembly is incorporated into the end cap (40) and includes a seal (44) disposed within an annular groove (46) about the circumference of the end cap (40). A secondary pathway is provided in the end cap (40) and provides a route for fluid to bypass the seal (44). More specifically, the secondary pathway comprises one or more ports (42) located about the outer periphery of the end cap (40) which join to form one or more common outlets (48) located on the outer face (52) of the end cap (40). A one-way valve (50) is mounted upon the outer face (52) of the end cap (40) and selective blocks the secondary pathway. As shown, the end cap (40) may include multiple secondary pathways and corresponding valves. In an alternative embodiment not shown, the first seal assembly may be incorporated into an end plate that is secured to an end cap of an element.

Figure 2:
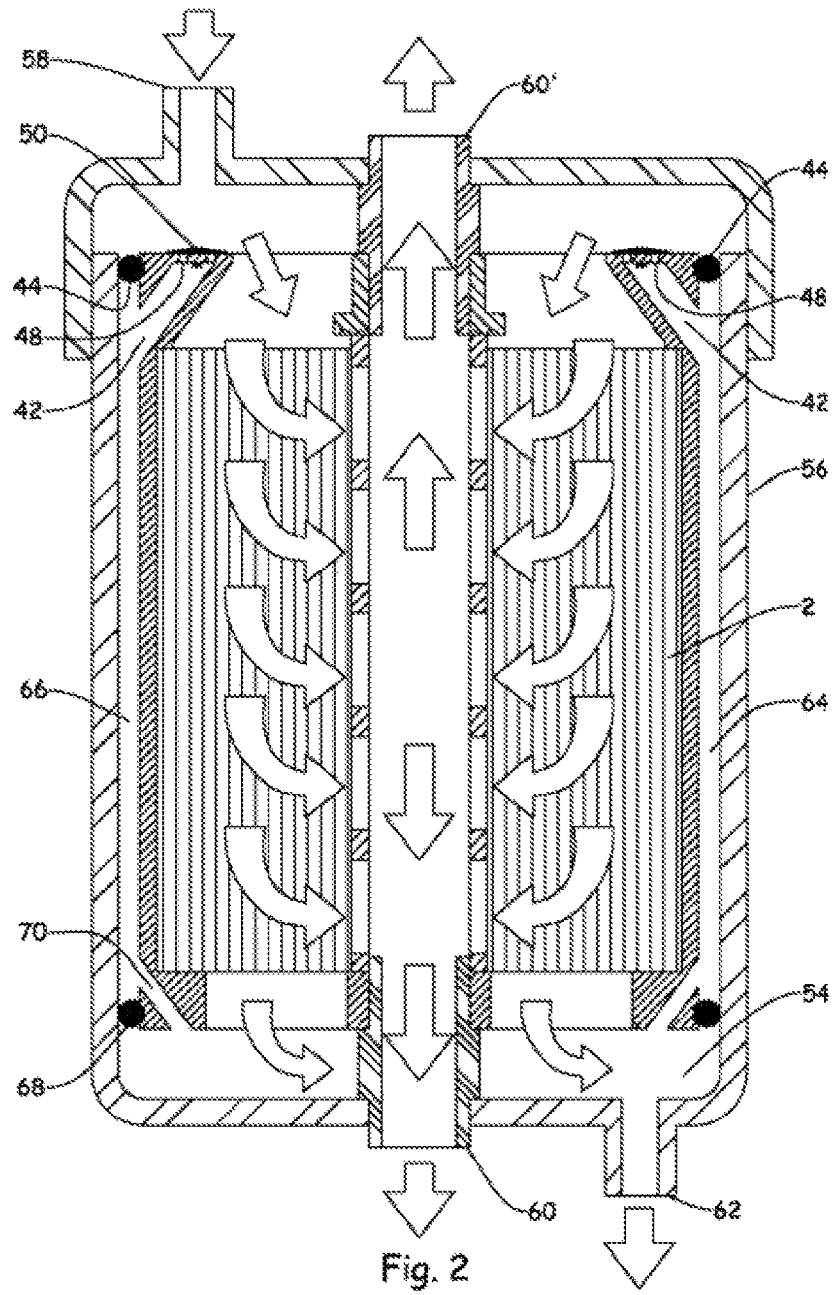
FIG. 2 is cross-sectional view of a spiral wound assembly including a pressure vessel showing fluid flow patterns during standard operation.
Figure 3:
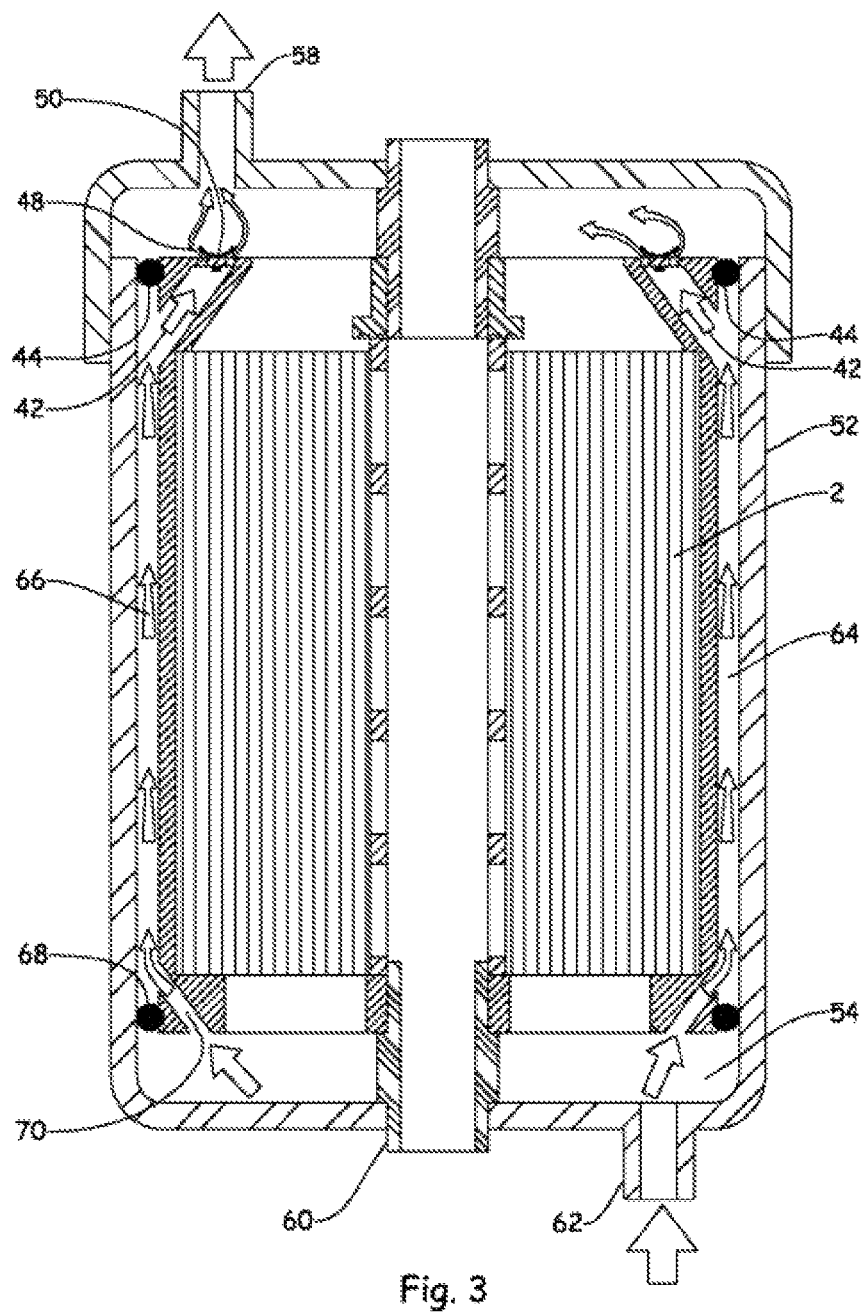
FIG. 3 is a view of the assembly of FIG. 2 shown operating in reverse flow.

In another embodiment illustrated in FIGS. 2 and 3, a spiral wound element (2) and a first seal assembly are located within a chamber (54) of a pressure vessel (56). The chamber (54) includes an inner periphery that preferably corresponds in shape with the outer periphery of the element(s), e.g. preferably both are cylindrical. The vessel (56) further includes a fluid inlet (58) and outlet (60, 62 and optionally 60') in fluid communication with the chamber (54). A space (64) is present between the inner periphery of the chamber (54) and the outer periphery of the spiral wound element (2) and defines an annular pathway (66) extending between the fluid inlet (58) and outlet (60, 62). The seal (44) is located within in this space (64) and restricts fluid flow along the annular pathway (66). The secondary pathway is in fluid communication with the annular pathway (66). As described below, valve (50) selectively permits fluid to flow through the secondary pathway and bypass the seal (44).

As an optional feature, the spiral wound assembly may further include a second seal assembly including a ring-shaped seal (68) disposed about a portion of the outer periphery of a spiral wound element (2) and a secondary pathway (70) in fluid communication with the annular pathway (66). In an embodiment not shown, the seal and secondary pathway may be integral, i.e. the secondary pathway comprises predefined orifices within the seal (68). When implemented within a pressure vessel embodiment, the first seal assembly may be located adjacent to the fluid inlet (58) and the second seal assembly may be located adjacent to the fluid outlet (60, 62). Preferably, the fluid inlet and outlet are located near opposing ends of the chamber (54) with one or more spiral wound elements (2) arranged serially within the chamber including a lead element and first seal assembly located adjacent to the fluid inlet (58), and a tail element and second seal assembly located adjacent to the fluid outlet (60, 62). The size and number of secondary pathways and corresponding valves is not particularly limited and will vary depending upon the specific application and operating conditions.

Arrows provided in FIGS. 2 and 3 indicate fluid flow patterns during standard filtering operation and reverse flow, respectively. During standard operation (i.e. forward flow), pressurized feed fluid enters the chamber (54) of the pressure vessel (56) by way of the fluid inlet (58), sequentially passes through the element (2) and exits the vessel (56) by way of the fluid outlet (60, 62). Feed fluid is restricted from freely bypassing the element(s) within the chamber (54) by one or more ring-shaped seals (44) located in the space (64) between the outer periphery of the element(s) and the inner periphery of the chamber (54). During normal operation, valve (50) remains closed and prevents (or partially limits) fluid from entering the annular pathway (66). Restricting flow along the annular pathway (66) during normal operation is necessary to achieve maximum operating efficiency.

During reverse flow, (e.g. prior to start up, during cleaning, etc.), pressurized fluid enters the chamber (54) from the fluid outlet (62) and travels toward the fluid inlet (58) by flowing both through the element(s) and along the annular pathway (66) located in the space (64) between the outer periphery of the element(s) and the inner periphery of the chamber (54). Valve (50) opens and permits fluid flowing along the annular pathway (66) to bypass the seal (44) via the secondary pathway. Valve (50) may be actuated by a variety of means; however, in a preferred embodiment the valve comprises a one-way check valve that is actuated by the pressure of counter flowing fluid (i.e. reverse flow). Permitting flow along the annular pathway (66) during reverse operation is useful for flushing air from the annulus and for sweeping stagnant fluid and accumulated foulants from the annulus during cleaning operations. In embodiments utilizing a second seal assembly, the secondary pathway (70) of the assembly may remain open through both forward and reverse flow. The secondary pathway (70) provides regulation of the flow through the annular pathway (66) during reverse flow and permits rapid equilibration of the pressure in the annular pathway (66) with that in the chamber (54) during system startup and shutdown.

In yet another embodiment not shown, the seal assembly may comprise an integrated valve and seal component including a ring-shaped seal disposed about an element with one or more orifices passing through the seal in combination with a corresponding valve (e.g. one-way check valve) that selectively permits fluid flow to pass through the orifice, e.g. along the annular pathway in one direction.

While shown as a vertical arrangement, the assembly may also be horizontal or at any desired angle. Moreover, multiple spiral wound elements may be sequentially positioned within the pressure vessel.

The seals used in the present invention are not particularly limited but are preferably "ring-shaped." The term "ring-shaped" is intended to describe a continuous loop or ring of material. The size and shape of the inner periphery of the seal (i.e. the space within the loop) is designed to accommodate the insertion of the element so that the seal is disposed about a portion of the outer to periphery of the element. As the seal is preferably made from an elastomeric material, the inner periphery of the seal need not correspond to the exact shape or dimension of the element but is preferably able to form an interference fit therewith. By way of example, many elements have a cylindrical outer periphery. For such cylindrical elements, preferred seals may include an elliptical inner periphery having an inner diameter of approximately the same but preferably smaller (e.g. 1-10% smaller) than the outer diameter of the element so that the seal is stretched about the outer periphery of the element and forms an interference fit. While in most embodiments the inner periphery of the seal is circular, the inner periphery may include alternative shapes including other elliptical shapes or may be polygonal. The term "interference fit" is intended to broadly describe a fastening or attachment of two or more parts by way of friction. In a preferred embodiment, the interference fit between the seal and the element comprises a fluid tight seal and is the sole source of sealing engagement between the seal and element. That is, while adhesives, tapes or other means may be used to secure the seal to the element, in a preferred embodiment the seal is sealingly engaged about the filter element by way of an interference fit without the use of adhesive, tape, shrink wrap materials or other such means. The terms "sealingly engage" and "sealing engagement" are intended to describe a fluid tight seal. Once installed about the element, the seal forms a band or length of continuous material about the outer periphery of the element. The width of the seal is not critical and most commonly comprises a relatively narrow band of continuous material about only a portion of the outer periphery of the element. The width of seal is not particularly limited and will depend upon the specific design of the element and other factors such as the length of the element, fluid operation pressure, tolerance between the outer periphery of the element and the inner periphery of the chamber. Specific examples of applicable seals include those described above in Background Art section including: Chevron and O-ring seals, e.g. located within a groove of an end cap, see U.S. Pat. Nos. 7,198,719, 6,224,767; tractrice shaped seals, see US 2010/0147781; foam seals, see U.S. Pat. No. 6,299,772;, split ring seals and other hard polymeric seals, see US 2011/0174713.

The structure defining the secondary pathway is not particularly limited and may comprise a conduit, channel or pipe which is in fluid communication with the annular pathway and is capable of routing fluid flow around the seal. The secondary pathway may comprise a single flow path or include multiple branches. For example, multiple ports located within outer periphery of the element (e.g. in the end cap located downstream from the seal) may lead to one or more ports on the face of an end plate. In some embodiments, the secondary pathway may be integral with an end cap, end plate or housing of the spiral wound element. Alternatively, the secondary pathway may comprise a separate part, e.g. a pipe or tube.

The valve(s) used in the present invention is not particularly limited but is preferably located at a point along the secondary pathway, e.g. at one end of the pathway. A preferred class of valves includes one-way flow valves, i.e. "check valves" including but not limited to: duckbill, poppet, umbrella and flapper type valves. Other applicable valves include float valves and multi-directional flow valves including but not limited to: ball, butterfly, control, and needle type valves. One preferred valve is an elastomeric (EPDM) umbrella valve available from Minivalve Inc., e.g. model UM 145.003-354.01.

The spiral wound element for use in the invention is not particularly limited. Spiral wound elements (also referred to as spiral wound "modules") are well known for use in a variety of fluid separations including both gas and liquid phase separations. Due to their spiral configuration, a relatively large membrane surface area can be packed into an individual element. Depending upon the specific membrane used, spiral wound elements can be used in a wide variety of applications including: reverse osmosis (RO), nanofiltration (NF), ultrafiltration (UF) and microfiltration (MF). Examples of common liquid separations include the treatment of liquid feeds such as the concentration and/or salt removal in food, dairy and sweetener feeds; desalination of water, removal divalent ionic species such as calcium and barium ions, and removal of larger constituents such as cysts, viruses, and pesticides. A typical element includes a permeate collection tube, at least one but preferably many membrane envelopes and an outer housing. While elements are available in a variety of sizes, one of the more common industrial RO elements is available with a standard 8, inch (20.3, cm) diameter and 40, inch (101.6, cm) length (8"×40", ). For a typical 8, inch diameter element, 26, to 30, individual membrane envelopes are wound around the permeate collection tube (i.e. for permeate collection tubes having an outer diameter of from about 1.5, to 1.9, inches (3.8, cm-4.8)). In operation, 1, to 8, elements are typically serially connected within a common pressure vessel. The individual elements within a vessel are usually of the same type, but different types of elements may be used, see US 2007/0272628. Specific examples of commercially available spiral wound elements include: RO-8038, and NF-2458038, Food & Dairy elements, BW30-440i brackish water element and SW30XLE-400i sea water desalination element, available from The Dow Chemical Corporation.

A spiral wound element suitable for use in the present invention is generally shown (2) in FIG. 3. The element (2) is formed by winding one or more membrane envelopes (4) and optional feed channel spacer sheet(s) ("feed spacers") (6) about a permeate collection tube (8). Each membrane envelope (4) preferably comprises two substantially rectangular membrane sheets (10) surrounding a permeate channel spacer sheet ("permeate spacer") (12). This sandwich-type structure is secured together, e.g. by sealant (14), along three edges (16, 18, 20) while the fourth edge (22) abuts the permeate collection tube (8) so that the permeate spacer (12) is in fluid contact with openings (24) passing through the permeate collection tube (8).

A membrane leaf packet is positioned on each side of the membrane envelope (4). Each leaf packet is shown comprising a substantially rectangular membrane sheet (10) folded upon itself to define two membrane "leaves" wherein the front sides (34) of each leaf are facing each other and the fold is axially aligned with the fourth edge (22) of the membrane envelope (4), i.e. parallel with to the permeate collection tube (8). The feed spacer (6) is shown located between facing front sides (34) of the folded membrane sheet (10) and is open along its radial ends to permit feed fluid to flow in an axial direction (i.e. parallel with the permeate collection tube (8)) through the element. In this embodiment, the membrane envelope (4) is formed by joining the back sides of two adjacently positioned membrane leaves. While not shown, additional intermediate layers may also be included in the assembly.

Figure 4:
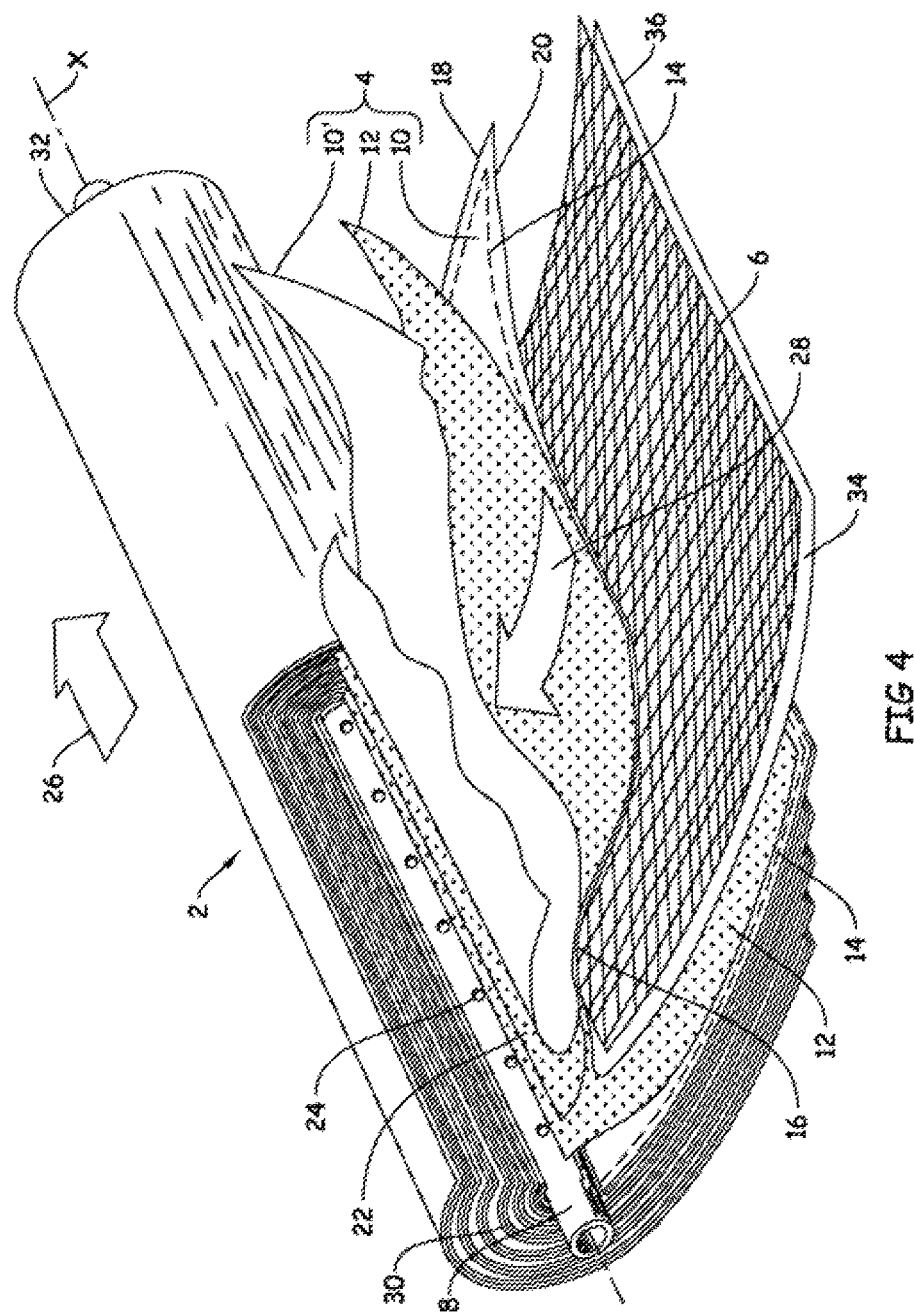
FIG. 4 is a perspective, partially cut-away view of a spiral wound element.

Arrows shown in FIG. 4 represent the approximate flow directions (26, 28) of feed and permeate during operation. Feed flow (26) is from the inlet end (30) to the outlet end (32) across the front side (34) of the membrane. Permeate flow (28) is along the permeate spacer (12) in a direction approximately perpendicular to the feed flow (26). Actual flow paths vary with details of construction and operating conditions.

During element fabrication, permeate spacers (12) are attached about the circumference of the permeate collection tube (8) and membrane leaves are interleaved therebetween. The back sides of adjacently positioned membrane leaves are sealed about portions of their periphery (16, 18, 20) to enclose the permeate spacer (12), i.e. form the membrane envelope (4). The membrane envelope(s) (4) and feed spacer(s) (6) are wound or "rolled" about the permeate collection tube and then held in place such as by tape (e.g. self adhering mesh tape) or other means until an outer housing can be secured about the partially constructed element (2). The sealant used for sealing the edges of the membrane envelope preferably permits relative movement of the various sheet materials during the winding process. That is, the cure rate or period of time before which the sealant becomes tacky is preferably longer than that required to assemble and wind the membrane envelopes and membrane leaves about the permeate collection tube.

Materials for constructing various components of spiral wound elements are well known in the art. Suitable sealants for sealing membrane envelopes include urethanes, epoxies, silicones, acrylates, hot melt adhesives and UV curable adhesives. While less common, other sealing means may also be used such as application of heat, ultrasonic welding and tape. Permeate collection tubes are typically made from plastic materials such as acrylonitrile-butadiene-styrene, polyvinyl chloride, polysulfone, poly(phenylene oxide), polystyrene, polypropylene, polyethylene or the like. Tricot polyester materials are commonly used as permeate spacers. Representative feed spacers are described in more detail in U.S. Pat. No. 6,881,336. Representative example feed spacers include polyethylene, polyester, and polypropylene mesh materials such as those commercially available under the trade name VEXAR™ from Conwed Plastics. The housing may be constructed from a variety of materials including stainless steel, tape and PVC material; however the most common element housing material is made from fiber reinforced plastics, e.g. long glass fibers coated with a thermoplastic or thermoset resin. During element fabrication, long glass fibers are wound about the partially constructed element and resin (e.g. liquid epoxy) is applied and hardened. The ends of to elements are often fitted with an anti-telescoping device or end cap (not shown) designed to prevent membrane envelopes from shifting under the pressure differential between the inlet and outlet ends of the element. The end cap may be fitted with a seal (not shown) to form a tight fluid connection between the outer periphery of the element and the internal periphery of the pressure vessel (not shown). Examples of end cap designs including FilmTec Corp's iLEC™ interlocking end cap along with those described in US 2011/0042294, and U.S. Pat. No. 6,632,356. Additional details regarding various components and construction of spiral wound elements are provided in the literature, see for example: U.S. Pat. No. 5,538,642, which describes a technique for attaching a permeate spacer to a permeate collection tube, U.S. Pat. No. 7,951,295, which describes trimming operations and the use of a UV adhesive for forming a insertion point seal, U.S. Pat. No. 7,875,177, which describes an applicable leaf packet and U.S. Pat. No. 5,096,584, which describes various embodiments, components and construction techniques particularly suited for gas separations.

For purposes of the present invention, the type of membrane sheet is not particularly limited. The selection of membrane sheet is dependant upon the specific application, feed source, solute, and foulants. While early RO and NF flat sheet membranes were made from cellulose acetate materials, asymmetric polysulfone and polyether sulfones membranes along with composite membranes have become more common in recent years. One preferred composite membrane sheet is FilmTec Corp's FT-30™, membrane which comprises a bottom layer (back side) of a nonwoven polyester material web (e.g. PET scrim), a middle layer of a microporous polymer such as polysulfone having a thickness of about 25-125, µm, and top layer (front side) comprising a thin film polyamide layer having a thickness less than about 1, micron and more commonly from about 0.010, to 0.1, micron. The polyamide layer is preferably created by an interfacial polycondensation reaction between a polyfunctional amine monomer and a polyfunctional acyl halide monomer upon the surface of the microporous polysulfone as described in: U.S. Pat. Nos. 4,277,344, 5,658,460, and 6,878,278. Representative methods of modifying such polyamide membranes are described in: U.S. Pat. Nos. 4,765,897, 4,888,116, 4,964,998, 5,755,964, 5,876,602, 6,280,853, 7,815,987, 7,882,963, 7,905,361, and 7,918,349.

The pressure vessel used in the present invention is not particularly limited but preferably include a solid structure capable of withstanding pressures associated with separation operating conditions. The vessel structure preferably includes a chamber having an inner periphery corresponding to that of the outer periphery of the element(s) to be housed therein. The length of the chamber preferably corresponds to the combined length of the elements to be sequentially (axially) loaded, e.g. typically from 1, to 8, elements. The vessel may also include one or more end plates that seal the chamber once loaded with elements. The vessel also includes at least one fluid inlet and outlet preferably located at opposite ends of the chamber. The orientation of the pressure vessel is not particularly limited, e.g. both horizontal and vertical orientations may be used. Examples of applicable pressure vessels, element arrangements and loading are described in: U.S. Pat. Nos. 6,074,595, 6,165,303, 6,299,772, US 2007/0272628, and US 2008/0308504. Manufacturers of pressure vessels include Pentair of Minneapolis Minn., Bekaert of Vista Calif. and Bel Composite of Beer Sheva, Israel.

Many embodiments of the invention have been described and in some instances certain embodiments, selections, ranges, constituents, or other features have been characterized as being "preferred." Such designations of "preferred" features should in no way be interpreted as an essential or critical aspect of the invention. It will be appreciated that multiple seal assemblies may be used per element or within a spiral wound assembly include multiple elements.

The entire content of each of the aforementioned patents and patent applications are incorporated herein by reference.

The invention claimed is:

1. A spiral wound assembly comprising:
a pressure vessel comprising a chamber including an inner periphery and a fluid inlet and outlet in fluid communication with the chamber,
a spiral wound element and a first seal assembly located within the chamber,
a space present between the inner periphery of the chamber and the outer periphery of the spiral wound element which defines an annular pathway extending between the fluid inlet and outlet,
wherein the first seal assembly comprises: a ring-shaped seal disposed about a portion of an outer periphery of the spiral wound element in the space and restricts fluid flow along the annular pathway,
a secondary pathway in fluid communication with the annular pathway and a valve that selectively permits fluid flow through the secondary pathway and bypass the seal.

2. The spiral wound assembly of claim 1 wherein the valve restricts fluid flow along the annular pathway from the fluid inlet toward the fluid outlet and permits fluid flow along the annular pathway from the fluid outlet toward the fluid inlet.

3. The spiral wound assembly of claim 1 wherein the fluid inlet and outlet are located near opposing ends of the chamber and wherein the spiral wound assembly further comprises: a plurality of spiral wound elements arranged serially within the chamber with a lead element and first seal assembly are located adjacent to the fluid inlet and a tail element and second seal assembly are located adjacent to the fluid outlet.

4. The spiral wound assembly of claim 1 wherein the first seal assembly comprises an integrated valve and seal component.

* * * * *